US008899610B2

(12) United States Patent
Venn

(10) Patent No.: US 8,899,610 B2
(45) Date of Patent: Dec. 2, 2014

(54) IMPLEMENT MOUNTING DEVICE

(76) Inventor: Christopher Graham Venn, Te Awamutu (NZ)

( * ) Notice: Subject to any disclaimer, the term of this patent is extended or adjusted under 35 U.S.C. 154(b) by 90 days.

(21) Appl. No.: 13/497,161

(22) PCT Filed: Aug. 30, 2010

(86) PCT No.: PCT/NZ2010/000171
§ 371 (c)(1),
(2), (4) Date: Jun. 4, 2012

(87) PCT Pub. No.: WO2011/034443
PCT Pub. Date: Mar. 24, 2011

(65) Prior Publication Data
US 2013/0056958 A1 Mar. 7, 2013

(30) Foreign Application Priority Data

Sep. 21, 2009 (NZ) ........................................ 579856

(51) Int. Cl.
*B60D 1/44* (2006.01)
*A01B 59/00* (2006.01)
*A01B 59/06* (2006.01)

(52) U.S. Cl.
CPC ............... *A01B 59/06* (2013.01); *A01B 59/004* (2013.01)
USPC ....................... 280/495; 280/491.1; 280/491.2

(58) Field of Classification Search
USPC ..................................... 280/495, 491.2, 491.1
See application file for complete search history.

(56) References Cited

U.S. PATENT DOCUMENTS

| 2,775,180 | A | 12/1956 | Du Shane |
| 4,280,281 | A | 7/1981 | Gerber |
| 5,758,918 | A | 6/1998 | Schneider et al. |
| 6,325,518 | B1 | 12/2001 | Whitehead et al. |
| 6,974,146 | B2 * | 12/2005 | Abair ............................ 280/470 |

OTHER PUBLICATIONS

International Search Report prepared by the Australian Patent Office on Nov. 2, 2010, for International Application No. PCT/NZ2010/000171.
Written Opinion of the International Preliminary Examining Authority prepared by the Australian Patent Office on Jun. 27, 2011, for International Application No. PCT/NZ2010/000171.
Applicant's Letter Accompanying Demand dated Jan. 27, 2011, for International Application No. PCT/NZ2010/000171.
International Preliminary Report on Patentability prepared by the Australian Patent Office on Jan. 16, 2012, for International Application No. PCT/NZ2010/000171.

* cited by examiner

*Primary Examiner* — Kevin Hurley
*Assistant Examiner* — Michael Stabley
(74) *Attorney, Agent, or Firm* — Sheridan Ross P.C.

(57) ABSTRACT

A mounting apparatus for mounting an implement to a vehicle, wherein the vehicle includes two spaced apart rigid arms fixed rigidly to the front or rear of the vehicle, the mounting apparatus including a movement transfer mechanism, and a pair of extension members linked to the movement transfer mechanism, the extension members configured to move when the movement transfer mechanism is operated, and a mounting means configured to attach an implement, and a housing, characterized in that each extension member includes a bracket, wherein the bracket is configured to engage with at least one or more arms of the vehicle. A method of using the mounting apparatus is also claimed.

15 Claims, 3 Drawing Sheets

IMPLEMENT MOUNTING DEVICE

CROSS REFERENCE TO RELATED APPLICATIONS

This application is a national stage application under 35 U.S.C. 371 of PCT Application No. PCT/NZ2010/000171 having an international filing date of 30 Aug. 2010, which designated the United States, which PCT application claimed the benefit of New Zealand Application No. 579856 filed 21 Sep. 2009, the entire disclosure of each of which is incorporated herein by reference.

TECHNICAL FIELD

The invention relates to the mounting of an implement to a vehicle. The invention has particular application to a quick hitch for mounting an implement to a vehicle.

BACKGROUND ART

It is common practice across a wide range of industries to adapt a vehicle by mounting an implement to the front or rear of the vehicle.

For example, an agricultural tractor usually includes a three-point hitch at the front (or rear) of the vehicle to allow, for example, a thresher or grader blade to be added. Other useful implements include mowers, fertiliser spinners, and carry trays. The ability to mount an implement to the vehicle increases its versatility.

However, for many vehicles, such as a ride-on mower, it is not practical to have a hitching or towing system.

For example, a Walker™ ride-on mower includes a dedicated mowing deck at the front of the vehicle. The presence of the mowing deck makes a hitching system impractical to mount to the front of the mower.

It may be possible to mount an extra implement, such as a spray boom, to the rear of a Walker™ ride-on mower to increase its versatility. However, mounting an implement to the rear of the ride-on mower does have its disadvantages.

Many optional implements, such as a spray boom, require for their effective use a clear field of vision for the user of the ride-on mower. Clearly, this is problematic when the implement is attached to the rear of the ride-on mower.

A spray boom is often used to disperse chemicals such as herbicides or pesticides, and these tend to be toxic to humans and other animals. Therefore, care is usually required when applying such chemicals in areas such as parks or playgrounds when pet animals or children may play.

Furthermore, care needs to be taken when applying chemicals to the surface to be treated. Repeated application of chemicals to an area already treated is wasteful of the chemicals.

Therefore, for many implements, it is necessary for the user of the ride-on mower to constantly check behind him or her that the implement is functioning as intended, but at the same time navigating the vehicle. It will be appreciated that this slows down whatever task the user is working on.

Other optional implements for ride-on mowers may include a fertiliser spinner or a retractable spray hose connected to a fluid reservoir for handgun spraying. Furthermore, many ride-on mowers (or indeed other small vehicles) are not provided with arrangements for mounting implements such as these even to the rear of the vehicle. This is particularly true of small automobiles or the like.

In order to utilise such a vehicle, a tow ball or hitch system needs to be purchased and installed on the vehicle before any towed implements may be used.

Typically, such installations are permanent. In some cases, the user of the vehicle may prefer not to have a permanent arrangement for mounting implements to the vehicle.

In order to fit implements to a vehicle it is often necessary to use extra tools such as allen keys or the like. The use of these small fiddly tools can add to the time required to install the required implement.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a mounting apparatus for mounting an implement to a vehicle, wherein the vehicle includes two spaced apart rigid arms fixed rigidly to the front or rear of the vehicle, the mounting apparatus including
   a movement transfer mechanism, and
   a pair of extension members linked to the movement transfer mechanism, the extension members configured to move when the movement transfer mechanism is operated, and
   a mounting means configured to attach an implement, and
   a housing,
   characterised in that
   each extension member includes a bracket, wherein the bracket is configured to engage with at least one or more arms of the vehicle.

According to another aspect of the present invention there is provided a method of using a mounting apparatus with a vehicle, wherein the vehicle includes two spaced apart rigid arms fixed rigidly to the front or rear of the vehicle, and wherein the mounting apparatus includes a movement transfer mechanism, a pair of extension arms linked to the movement transfer mechanism, the extension members configured to move when the movement transfer mechanism is operated, a mounting means configured to attach an implement, and a housing, wherein each extension member includes a bracket, wherein the bracket is configured to engage with at least one or more arms of the vehicle.
   characterised by the steps of:
i) placing the mounting apparatus between the arms of the vehicle, and ii) operating the movement transfer mechanism of the mounting device such that the brackets of the extension arms engage with the arms of the vehicle.

An implement may be any suitable implement configured for a particular purpose and which is adapted to be mounted to a vehicle. For example, the implement may be a hoist, mechanical shovel, agricultural thresher, or harvester.

Preferably, the implement is a spraying apparatus. However, a person skilled in the art will appreciate that the present invention may be used with a wide variety of implements adapted to be mounted to a vehicle, and the use of the present invention is not limited to spraying apparatus.

For example, the present invention may be used with a small automobile to allow the vehicle to tow a trailer or the like.

The vehicle may be any suitable vehicle, powered by an internal combustion engine or otherwise. The vehicle may be an automobile, tractor, or truck. However, a person skilled in the art will appreciate that the use of the present invention with the aforementioned vehicles is not meant to be limiting, and the present invention may be used with a wide variety of vehicles.

Preferably, the vehicle is a ride-on mower, such as those typically manufactured by Walker™ or John Deere™.

A Walker™ ride-on mower is configured with a mowing deck extended forwards from the front wheel base of the mower. The mowing deck is secured to the mower by way of a pair of carrier arms extending forward from the body of the mower.

However, a person skilled in the art will appreciate that the present invention may be used with any vehicle suitably configured with a pair of arms proximate to the front or the rear of the vehicle.

In some embodiments of the present invention, it should be appreciated that the arms may be the left and right side members that make up the longitudinal lengths of the chassis of the vehicle.

In alternative embodiments of the present invention, the arms may be bull bars, which are common on utility trucks, or the like.

A movement transfer mechanism should be understood to mean a mechanism by which movement in one direction is converted to movement in another direction.

Preferably, the movement transfer mechanism is a mechanism by which rotational movement is converted to linear movement. For example, the movement transfer mechanism may be a rack and pinion, a screw jack, wheel or disc, but preferably is a bevel gear.

Reference shall now be made throughout the remainder of the specification to the movement transfer mechanism as being a bevel gear mounted on an axle.

A bevel gear is preferred as it offers relatively fine control of the degree of extension (or retraction) of the extension members. This may be useful when using the present invention with different types of vehicles. A bevel gear also provides a relatively smooth action.

However, this should not be seen as limiting. A person skilled in the art will appreciate from the ensuing discussion, that there are a number of ways in which the movement transfer mechanism could be implemented.

Preferably, the movement transfer mechanism includes a handle or the like to allow the user of the invention to rotate the movement transfer mechanism. In some embodiments of the present invention, the handle may simply be a knob or the like on one end of the axle of the bevel gear.

The bevel gear is linked to a pair of longitudinal extension members. It should be understood that the extension members are located either side of the bevel gear.

Preferably, the longitudinal lengths of the extension members are in the same plane as the axis of rotation of the bevel gear.

However, persons skilled in the art that it is possible for the axis of rotation of the bevel gear and the longitudinal length of the extension members may be perpendicular to one another depending on the packaging preferences of the user of the apparatus.

Each extension member is provided with a means to engage with the movement transfer mechanism.

Preferably, the means of engaging with the movement transfer mechanism is a secondary bevel gear at the end of the member proximate to the bevel gear of the movement transfer mechanism. However, this should not be seen as limiting. In some embodiments of the present invention, a portion of the extension member may be configured with a rack which engages with the gear bevel of the movement transfer mechanism.

In another embodiment of the present invention, the movement transfer mechanism may be a disc or wheel, and the extension members are joined to the circumference of the disc via a link or articulated arm.

In yet another embodiment of the present invention, the movement transfer mechanism may be a lever linked via articulated arms to the extension members. Movement of the lever in one direction causes movement of the extension members outwards, while moving the lever in the opposite direction causes movement of the extension members inwards.

Persons skilled in the art will appreciate that there are a number of ways in which the extension members can engage with the movement transfer mechanism. However, reference shall now be made to the engaging means of the extension member as being the secondary bevel gears. Reference shall now be made throughout the remainder of the specification as the bevel gear of the movement transfer mechanism as being the main bevel gear.

Preferably, the secondary bevel gears of the extension members are substantially perpendicular to the main bevel gear. A person skilled in the art will appreciate that the main bevel gear and the secondary bevel gears of the extension members intermesh, such that as the main bevel gear rotates, the secondary bevel gears also rotate.

Preferably, the secondary bevel gears are provided with a threaded axle passing into the extension member. The body of the extension member is provided with a Corresponding thread to that of the secondary bevel gears of the extension members.

A person skilled in the art should appreciate that the main bevel gear and secondary bevel gears of the extension members are fixed such that they are only capable of rotational movement.

Therefore, as the main bevel gear rotates, this in turn causes rotation of the secondary bevel gears of the extension members and thereby the threaded axle of the secondary bevel gears. This in turn causes movement of the extension member away or towards the main bevel gear cog depending on the direction of rotation of the secondary bevel gears.

It should be appreciated that one end of each extension member is provided with a means to engage with the movement transfer mechanism. These ends can be thought of as the inner ends of the extension members. At the opposing ends, which can be thought of as the outer ends, each extension member is provided with a bracket.

These brackets engage with the arms of the vehicle to which the invention is to be attached. Depending on the configuration of the arms of the vehicle, which typically have a circular or square profile, the brackets may have a substantially semi-circular or square profile such that they enclose a portion of the profile of the arms of the vehicle.

However, persons skilled in the art will appreciate that other ways of engaging with the arms of the vehicle are envisaged. For example, the bracket may engage with recesses in the arms of the vehicle.

In some embodiments of the present invention, the brackets may be able to be articulated independently of the extension members. This allows the brackets to engage with both horizontal members (such as the arms of a mowing deck) and vertical members (such as the struts of bull bars), increasing the versatility of the present invention.

In some embodiments of the present invention, the brackets may be fixed, with the extension members able to rotate within the housing. Again this allows the brackets to engage with both horizontal and vertical members. Persons skilled in the art will appreciate that this is of course contingent on the cross-section of the extension member as well as how the secondary bevel gears of the extension member engages with the movement transfer mechanism.

The mounting apparatus includes a housing for the main bevel gear and the extension members.

Preferably, the extension members are configured to be slideably moveable within the housing, such that the extension members are able to move in and out of the housing. The housing provides some support for the extension member, particularly in its extended state.

In some embodiments of the present invention, the housing may be provided with a carry handle for a user to carry the apparatus. This makes the apparatus easy to handle and transport as required.

Preferably, the housing is fabricated from metal or the like. Alternatively, the housing may be fabricated from plastics material, although persons skilled in the art will appreciate that plastics material may not have the structural integrity to withstand heavy use or be able to mount heavy working implements such as a hoist.

The housing should be understood to have an inner face and an outer face. The inner face faces the user of the vehicle, while the outer face faces the environment in which the vehicle is being used.

Preferably, the axle of the main bevel gear passes through the inner face of the housing. It will be understood that the user of the vehicle faces the handle or means by which the main bevel gear can be manipulated. Persons skilled in the art will appreciate that this means that the axle of the main bevel gear is substantially horizontal.

Preferably, the outer face of the housing is provided with the mounting means for an implement. However, persons skilled in the art will appreciate that the mounting means for the implement may be provided on the top, bottom, or sides of the housing, depending on the implement which is intended to be mounted.

Depending on the implement to be used, the mounting means may simply be a tab or plurality of tabs or protrusions extending from the outer face of the apparatus. The tab may include a plurality of apertures such that an implement may be bolted to the apparatus.

In some embodiments of the present invention, the mounting means may be a three point hitch or a tow ball.

In some embodiments of the present invention, the handle may be situated on an upper side of the housing invention, such that the handle faces upwards. In this embodiment, persons skilled in the art will appreciate that the axle of the main bevel gear passes through the upper side of the housing, and the axle is substantially vertical.

This arrangement can be particularly advantageous as it allows more space on the inner and outer faces of the housing for additional mounting means. For example, the inner face may be provided with a mounting means in the form of a tow ball, while the outer face may have a mounting means in the form of a tabs or protrusions.

In some embodiments of the present invention, both the housing and extension members may include apertures for a locking means such as a pin or bolt.

Alternatively, the movement transfer mechanism may include apertures through which the locking means may pass.

Persons skilled in the art will appreciate that other locking arrangements would be straightforward to implement.

The locking means is to ensure that any vibrations which may occur as the vehicle with which the invention is used traverses uneven ground do not cause inadvertent movement of the movement transfer mechanism. Such movement may result in the extension members withdrawing into the housing and the mounting apparatus becoming separated from the vehicle.

In use, the user disengages the mowing deck of the Walker™ mower. This leaves the arms of the mower bare. The present invention is then situated between the arms.

By articulating the handle of the main bevel gear, the user is able to move the extension arms of the apparatus outwards.

This causes the brackets of the extension members to engage with the arms of the mower. Thus, the arms bear the weight of the mounting apparatus. The implement can then be mounted to the mounting apparatus.

The arms may be locked relative to the housing by passing a pin through apertures in the housing and corresponding apertures in the arms. Alternatively, the main bevel gear may be locked by passing a pin through suitably configured apertures in the housing and main bevel gear.

These locking mechanisms are to ensure that there is no undesired movement of the main bevel gear which may cause inadvertent retraction of the extension members of the apparatus once it is in place on the vehicle.

The desired implement, which may be a spraying apparatus or even a mowing deck, can then be secured to the apparatus. The vehicle can then be used as appropriate.

When the implement is no longer required, the user merely articulates the handle of the main bevel gear in the opposite direction. This disengages the brackets from the carrier arms of the vehicle, and the apparatus and its mounted implement can be removed from the vehicle. This quickly returns the vehicle to its original state.

The present invention offers a number of advantages over the prior art.

It is quick and easy to install on a vehicle.

It is readily adapted to allow a wide variety of implements to be carried by the vehicle with which the present invention is to be used, thus increasing the versatility of the vehicle.

It allows vehicles without tow balls or three point hitches to use working implements.

It allows for implements to be mounted to a vehicle without any special tools.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
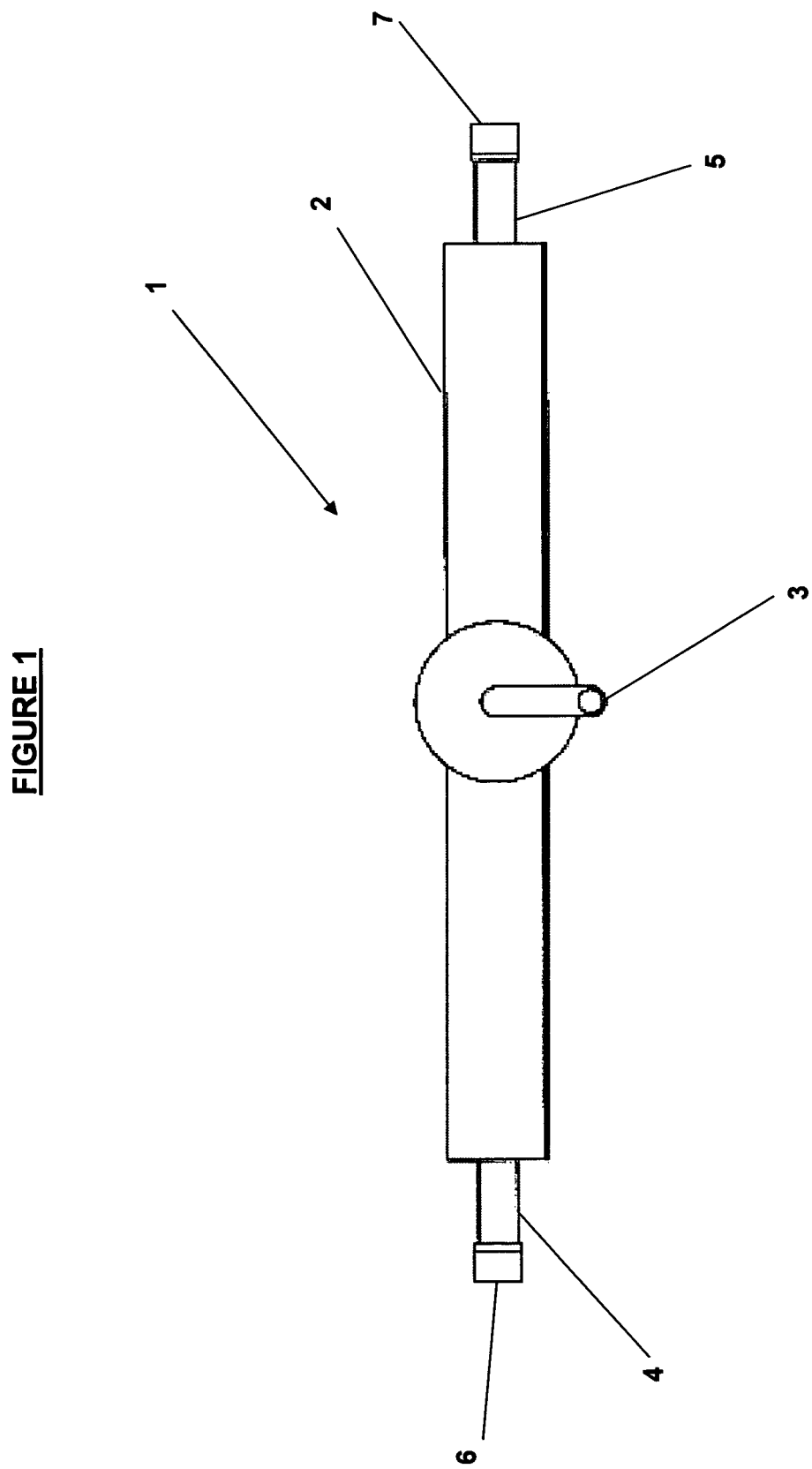
FIG. 1 shows a rear view of the present invention.

The present invention (generally indicated by arrow 1) is illustrated in FIG. 1. The invention is an implement mounting device (1) which consists of a housing (2) in which a main bevel gear (not shown) is located.

The axle (not shown) of the main bevel gear (not shown) is able to be rotated by articulation of the handle (3). The apparatus (1) includes a pair of extension members (4, 5). Each extension arm (4, 5) has a bracket (6, 7) at its outer end, which engages with the arms (not shown) of the vehicle (not shown) with which the mounting device (1) is to be used:

Rotation of the main bevel gear (not shown) moves the extension members (4, 5) into or Out of the housing (2), depending on which way the main bevel gear (not shown) is rotated.

Figure 2:
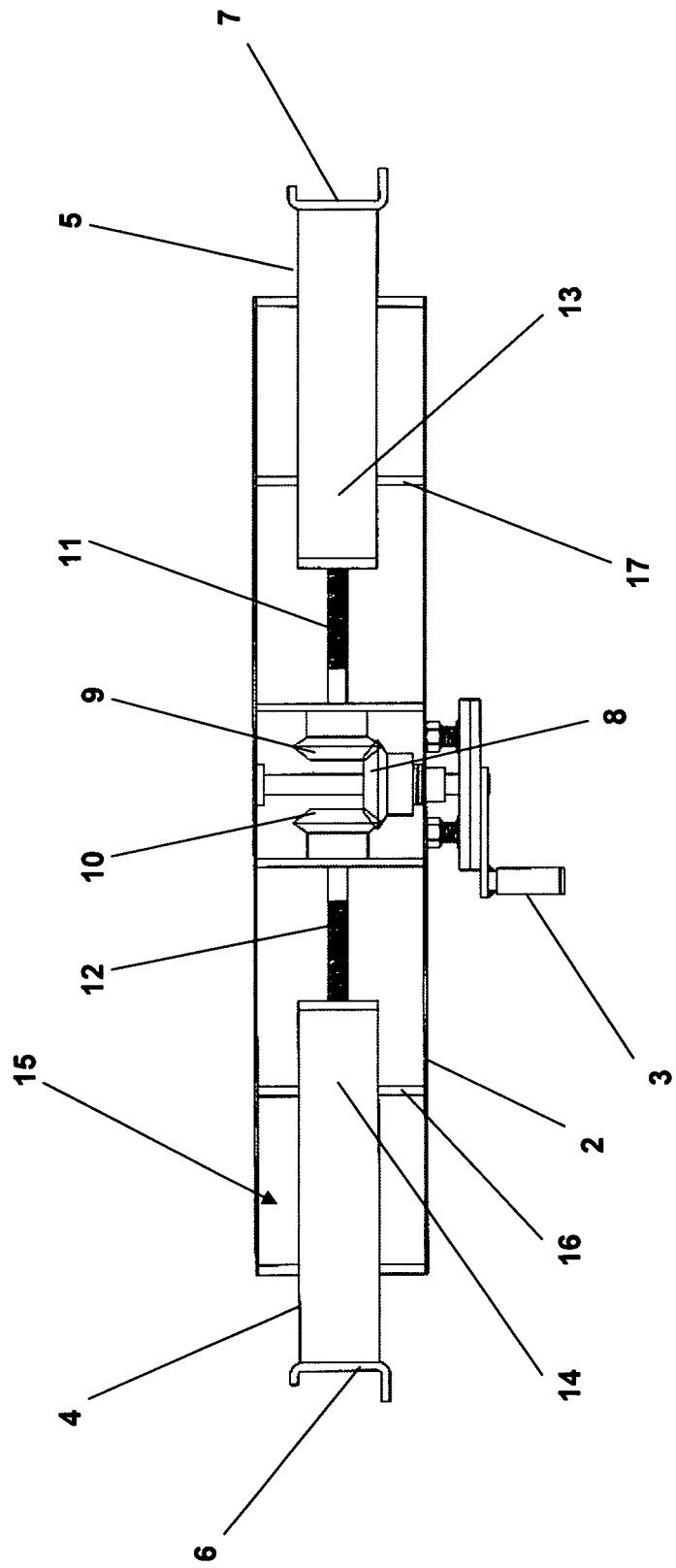
FIG. 2 shows a cross-section of the present invention.

Turning now to FIG. 2, the main bevel gear (8) and the secondary bevel gears (9, 10) of the extension arms (4, 5) can be appreciated.

The secondary bevel gears (9, 10) of the extension arms (4, 5) are connected via a threaded axle (11, 12) passing into the body (13, 14) of the extension arms (4, 5).

At various points along the interior (15) of the housing (2) are provided brackets (16, 17) through which the extension arms pass. These brackets (16, 17) help support the extension arms (4, 5) as they move in and out of the housing (2).

Upon rotation of the main bevel gear (8), by way of articulation of the handle (3), the secondary bevel gears (9, 10) of the extension arms (4, 5) also rotate. This causes the threaded axles (11, 12) to also rotate moving the extension arms (4, 5) away or towards the secondary bevel gears (9, 10) depending on the direction of rotation of the main bevel gear (8).

In this manner, the brackets (6, 7) of the extension arms (4, 5) can be situated against the arms (not shown) of a vehicle (not shown).

Figure 3:
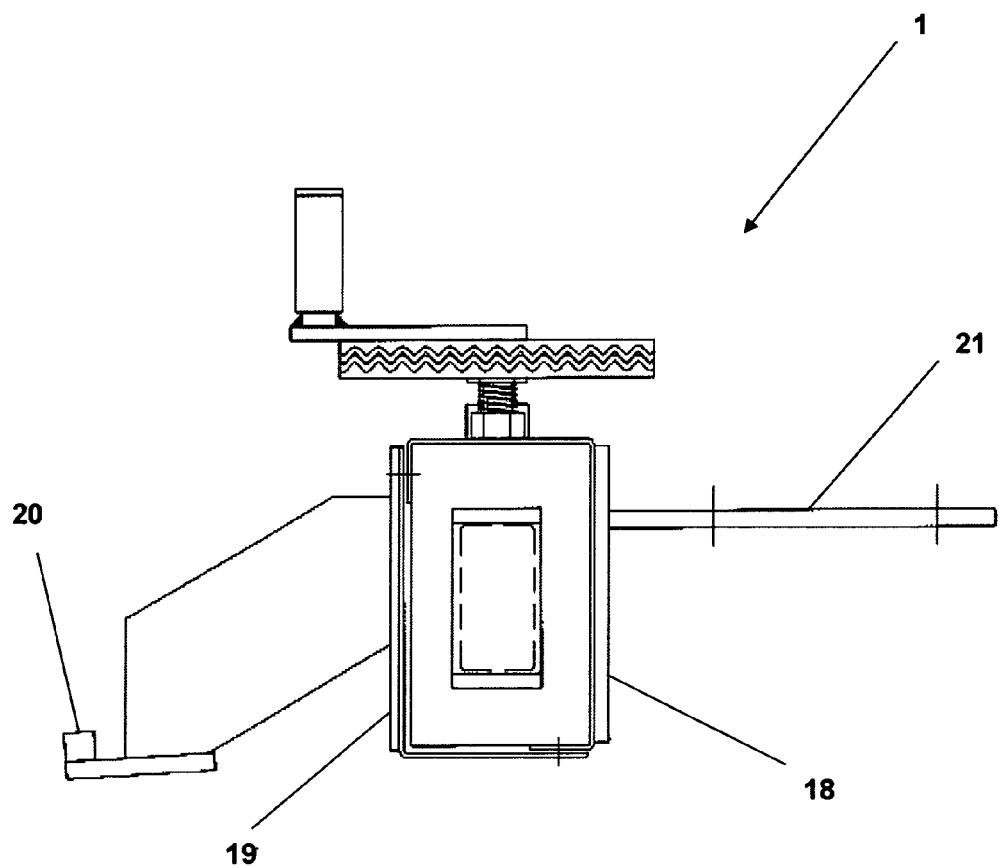
FIG. 3 shows a end view of the present invention.

FIG. 3 shows an end view of the mounting device (1). In this view it will be appreciated that both the inner (18) and outer face (19) of the device (1) can be provided with means for mounting an implement (not shown).

The outer face includes a tow ball mounting (20) to allow a suitably configured implement (not shown) to be mounted to the present invention (1). On the inner face (18), a pair of tabs (21—only one tab is illustrated in this view) extends from the inner face (18) of the present invention (1). Each tab (21) may be provided with a number of apertures or slots (not shown) to which implements (not shown) can be bolted as required.

Aspects of the present invention have been described by way of example only and it should be appreciated that modifications and additions may be made thereto without departing from the scope thereof as defined in the appended claims.

What I claim is:

1. A mounting apparatus for mounting an implement to a vehicle, wherein the vehicle includes two spaced apart rigid arms fixed rigidly to the front or rear of the vehicle, the mounting apparatus including
    a movement transfer mechanism, wherein the movement transfer mechanism is a main bevel gear to convert rotational movement to linear movement, and
    a pair of extension members linked to the movement transfer mechanism, the extension members move when the movement transfer mechanism is operated, and
    a mounting means that attaches the implement, and
    a housing,
    characterised in that
    each extension member includes a bracket, wherein the bracket engages with at least one or more arms of the vehicle, and wherein each extension member includes a secondary bevel gear that intermeshes with the main bevel gear.

2. An apparatus as claimed in claim 1 wherein the secondary bevel gears of the extension members are mounted to a threaded axle passing into the extension member.

3. An apparatus as claimed in claim 1 wherein the extension members include a rack complementary to the movement transfer mechanism.

4. An apparatus as claimed in claim 1, wherein the extension members are slideably engaged with the housing such that the extension members are able to move in and out of the housing.

5. An apparatus as claimed in claim 1, wherein the housing includes a carry handle.

6. An apparatus as claimed in claim 1, wherein the housing includes the mounting means for the implement.

7. An apparatus as claimed in claim 6 wherein the mounting means includes at least one tab extending from the housing.

8. An apparatus as claimed in claim 7 wherein the at least one tab includes a plurality of apertures to which the implement may be bolted.

9. An apparatus as claimed in claim 1, wherein the mounting means is a tow ball.

10. An apparatus as claimed in claim 1, wherein the mounting means is a three point hitch.

11. An apparatus as claimed in claim 1, wherein the movement transfer means is operable via a handle.

12. An apparatus as claimed in claim 1, wherein the apparatus includes a locking mechanism for the extension arms.

13. An apparatus as claimed in claim 1, wherein the vehicle is a ride-on mower.

14. A method of using a mounting apparatus with a vehicle, wherein the vehicle includes two spaced apart rigid arms fixed rigidly to the front or rear of the vehicle, and wherein the mounting apparatus includes a movement transfer mechanism, wherein the movement transfer mechanism is a main bevel gear to convert rotational movement to linear movement, a pair of extension arms linked to the movement transfer mechanism, the extension members move when the movement transfer mechanism is operated, a mounting means that attaches an implement, and a housing, wherein each extension member includes a bracket, wherein the bracket engages with at least one or more arms of the vehicle, and wherein each extension member includes a secondary bevel gear that intermeshes with the main bevel gear, characterised by the steps of:
    i) placing the mounting apparatus between the arms of the vehicle, and
    ii) operating the movement transfer mechanism of the mounting device such that the brackets of the extension arms engage with the arms of the vehicle.

15. The method of claim 14, wherein the vehicle is a ride-on mower.

\* \* \* \* \*